United States Patent
Ruberte Sanchez et al.

(10) Patent No.: US 10,823,406 B2
(45) Date of Patent: Nov. 3, 2020

(54) ATTACHMENT OF CERAMIC MATRIX COMPOSITE PANEL TO LINER

(71) Applicant: United Technologies Corporation, Farmington, CT (US)

(72) Inventors: Jose E. Ruberte Sanchez, Jupiter, FL (US); Timothy J. McAlice, Jupiter, FL (US); Kevin L. Rugg, Fairfield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 303 days.

(21) Appl. No.: 15/801,557

(22) Filed: Nov. 2, 2017

(65) Prior Publication Data

US 2018/0156456 A1    Jun. 7, 2018

Related U.S. Application Data

(62) Division of application No. 14/588,471, filed on Jan. 2, 2015, now Pat. No. 9,890,953.

(60) Provisional application No. 61/925,732, filed on Jan. 10, 2014.

(51) Int. Cl.
   *F23R 3/00*   (2006.01)
   *F23M 5/04*   (2006.01)
   *F23R 3/60*   (2006.01)
   *F02K 1/82*   (2006.01)

(52) U.S. Cl.
   CPC .............. *F23M 5/04* (2013.01); *F02K 1/82* (2013.01); *F23R 3/002* (2013.01); *F23R 3/007* (2013.01); *F23R 3/60* (2013.01); *F23R 2900/00017* (2013.01); *Y10T 29/49231* (2015.01)

(58) Field of Classification Search
   CPC ... F02K 1/80; F02K 1/82; F02K 1/822; F02K 3/10; F23R 3/002; F23R 3/007; F23R 3/60; F23R 2900/00017; F23M 5/04; F01D 25/246–28
   See application file for complete search history.

(56) References Cited

U.S. PATENT DOCUMENTS

| 4,512,159 A | 4/1985 | Memmen |
| 4,748,806 A * | 6/1988 | Drobny ................... F02K 1/80 60/800 |
| 4,848,089 A | 7/1989 | Cramer |
| 4,944,151 A | 7/1990 | Hovnanian |

(Continued)

OTHER PUBLICATIONS

European Search Report for European Patent Application No. 15150263.0 dated Jun. 1, 2015.

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A combined liner and panel for use in a gas turbine engine comprise a ceramic matrix composite panel having a plurality of extending members extending away from a face of ceramic matrix composite panel which will face hot products of combustion. A liner includes a plurality of spring members that apply a bias force biasing the extending members. The spring members bias the extending members on the panel in a direction away from the face of the panel which will face the hot products of combustion. A gas turbine engine, and a method of attaching a ceramic matrix composite panel to a liner are also disclosed.

1 Claim, 6 Drawing Sheets

(56) References Cited

U.S. PATENT DOCUMENTS

| | | |
|---|---|---|
| 5,069,034 A | 12/1991 | Jourdain et al. |
| 5,201,799 A | 4/1993 | Johnson |
| 5,265,411 A | 11/1993 | Belsom |
| 5,337,583 A * | 8/1994 | Giles ................ F01D 9/023 24/573.09 |
| 5,553,455 A | 9/1996 | Craig et al. |
| 5,584,173 A * | 12/1996 | Lybarger ............ F02K 1/805 239/265.11 |
| 5,592,814 A * | 1/1997 | Palusis ............... F02K 1/80 60/753 |
| 5,755,093 A * | 5/1998 | Palusis ............. F02K 1/002 60/266 |
| 6,901,757 B2 * | 6/2005 | Gerendas ........... F23M 5/00 110/336 |
| 7,546,743 B2 | 6/2009 | Bulman et al. |
| 7,647,779 B2 | 1/2010 | Shi et al. |
| 7,874,059 B2 | 1/2011 | Morrison et al. |
| 8,122,727 B2 | 2/2012 | Shi et al. |
| 2004/0250549 A1 * | 12/2004 | Liebe ................. F23R 3/002 60/804 |
| 2005/0086945 A1 * | 4/2005 | Tiemann ............. F23M 5/04 60/800 |
| 2006/0101827 A1 * | 5/2006 | Ryan ................. F23R 3/007 60/796 |
| 2011/0123323 A1 * | 5/2011 | Ruberte Sanchez .... F01D 25/00 415/200 |
| 2011/0146944 A1 * | 6/2011 | Hand ................. F02K 1/822 165/47 |
| 2014/0090399 A1 * | 4/2014 | McAlice .............. F02K 1/82 60/796 |
| 2014/0109594 A1 * | 4/2014 | Casavant ............. F02C 7/20 60/796 |
| 2015/0071704 A1 * | 3/2015 | Senofonte ........... F02K 1/80 403/299 |

* cited by examiner

ATTACHMENT OF CERAMIC MATRIX COMPOSITE PANEL TO LINER

CROSS-REFERENCE TO RELATED APPLICATION

This application is a divisional of U.S. patent application Ser. No. 14/588,471, filed Jan. 2, 2015, which claims priority to U.S. Provisional Patent Application No. 61/925,732, filed Jan. 10, 2014.

BACKGROUND OF THE INVENTION

This application relates to the attachment of a ceramic matrix composite panel to a liner for use in a gas turbine engine.

Gas turbine engines are known and, typically, include a fan delivering air into a compressor where the air is compressed. The compressed air is delivered downstream into a combustion section where it is mixed with fuel and ignited. Products of this combustion pass downstream over turbine rotors and then exit through an exhaust nozzle. The exhaust nozzle may also be provided with an augmentor, which provides additional combustion downstream of the turbine rotors.

As can be appreciated, the combustor and downstream sections may see very high temperatures. Thus, protective heat resistant liners are utilized. One type of liner relies upon a ceramic matrix composite panel which is attached to a metal liner.

There are challenges with attaching ceramic matrix composite materials as they may be somewhat brittle.

SUMMARY OF THE INVENTION

In a featured embodiment, a combined liner and panel for use in a gas turbine engine comprise a ceramic matrix composite panel having a plurality of extending members extending away from a face of ceramic matrix composite panel which will face hot products of combustion. A liner includes a plurality of spring members that apply a bias force biasing the extending members. The spring members bias the extending members on the panel in a direction away from the face of the panel which will face the hot products of combustion.

In another embodiment according to the previous embodiment, the spring members include a spring ring received within the extending members.

In another embodiment according to any of the previous embodiments, the extending members are rings and the spring rings are received within the extending members.

In another embodiment according to any of the previous embodiments, the spring ring has a central slot such that it has two sides.

In another embodiment according to any of the previous embodiments, the liner has a plurality of apertures, each provided with a finger. The finger receives the spring members.

In another embodiment according to any of the previous embodiments, the spring rings have chamfers on at least one end to facilitate movement of the extending members onto the spring rings.

In another embodiment according to any of the previous embodiments, the apertures in the liner are C-shaped and surround the finger.

In another embodiment according to any of the previous embodiments, the spring members are separate from the finger and are fixed to the liner.

In another embodiment according to any of the previous embodiments, the spring members are fixed to the liner at a location beyond the fingers.

In another embodiment according to any of the previous embodiments, the spring members have a first end fixed to the liner, and a second end that is in contact with the finger. The spring rings are intermediate the first and second ends.

In another embodiment according to any of the previous embodiments, a central web is formed on the spring between the first and second ends and is bowed away from the finger.

In another embodiment according to any of the previous embodiments, the extending members on the panel bias the spring rings away from a relaxed position to create the bias force.

In another featured embodiment, a gas turbine engine comprises a combustor section and an exhaust section downstream of the combustor section. A panel and liner combination is mounted at a location in the combustor, or downstream of the combustor, with the combination including a ceramic matrix composite panel having a plurality of extending members extending away from a face of ceramic matrix composite panel which will face hot products of combustion, and a liner, including a plurality of spring members. The spring members apply a bias force biasing the extending members. The spring members bias the extending members in a direction away from the face of the panel which will face the hot products of combustion.

In another embodiment according to the previous embodiment, the spring member includes a spring ring received within the extending members.

In another embodiment according to any of the previous embodiments, the extending members are rings and the spring rings are received within the extending members.

In another embodiment according to any of the previous embodiments, the liner has a plurality of apertures, each provided with a finger. The finger receives the spring members.

In another embodiment according to any of the previous embodiments, the spring rings have chamfers on at least one end to facilitate movement of the extending members onto the spring rings.

In another featured embodiment, a method of attaching a ceramic matrix composite panel to a liner comprises providing a ceramic matrix composite panel having a plurality of members extending away from a face of ceramic matrix composite panel which will face hot products of combustion, and a liner including a plurality of spring members. The extending members on the panel slide onto the spring members on the liner to create a bias force.

In another embodiment according to the previous embodiment, the liner is formed with apertures. The extending members are moved through the apertures prior to being slid onto the springs.

In another embodiment according to any of the previous embodiments, the extending members are rings. The spring member includes a spring ring. The extending member ring is slid onto the spring ring.

These and other features may be best understood from the following drawings and specification.

DETAILED DESCRIPTION

Figure 1:
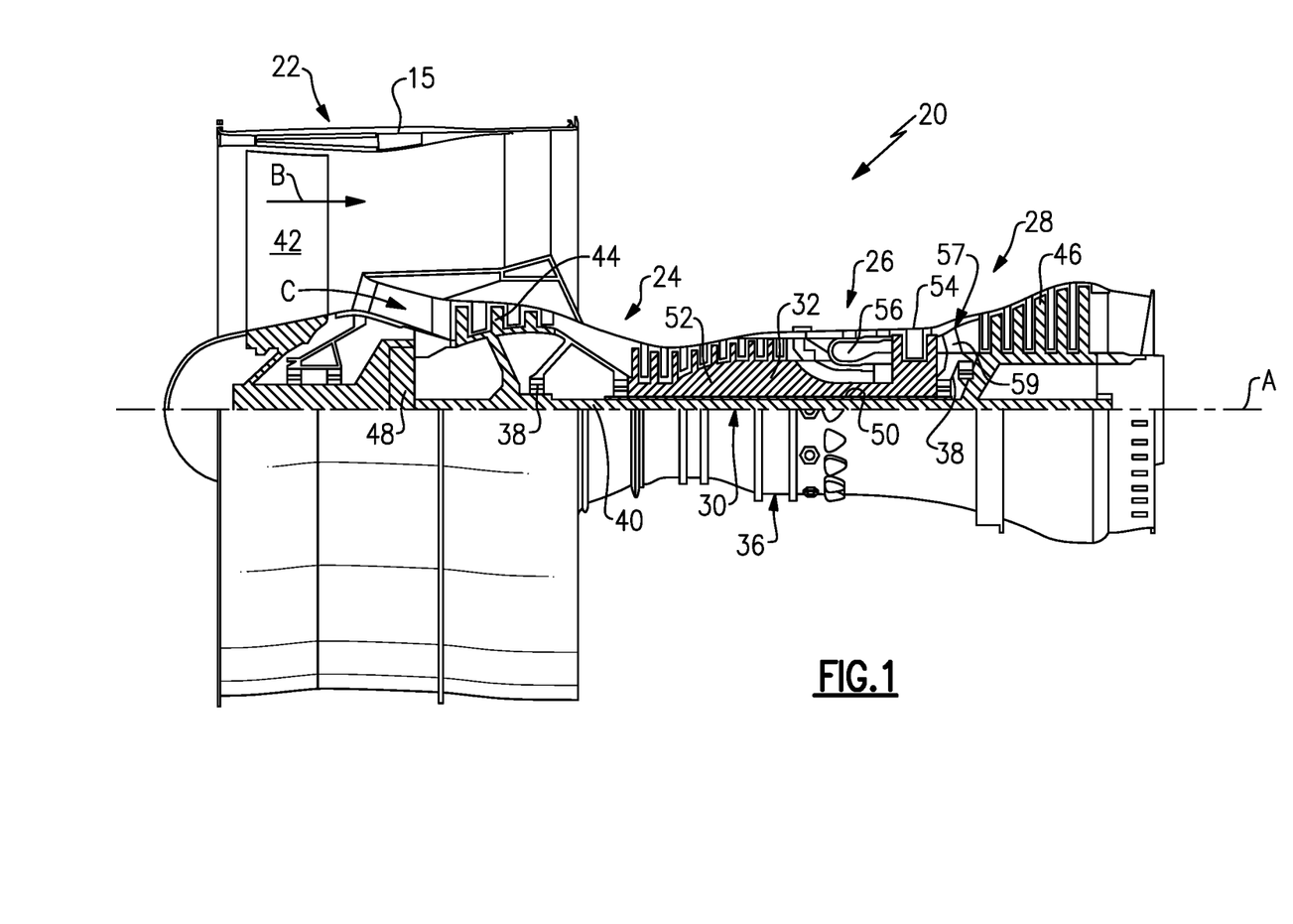
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
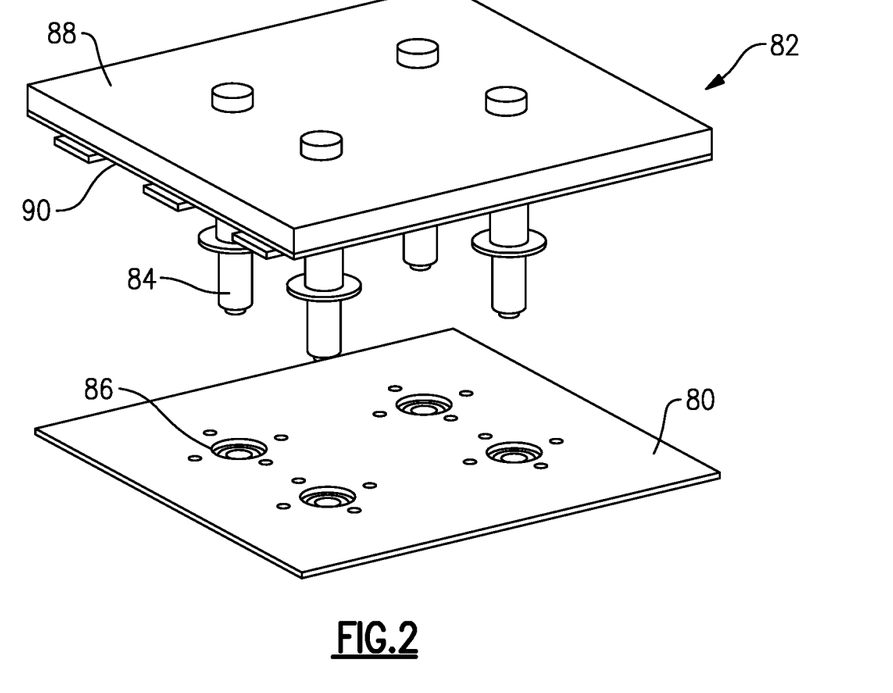
FIG. 2 shows a liner and panel combination which may be utilized at a number of locations in an engine such as the FIG. 1 engine.

FIG. 2 shows a duct 80 which is provided with a plurality of holes 86 to receive studs or bolts 84 from a combined CMC panel and backing liner 82. The panel 88 will face hot products of combustion in an engine such as the FIG. 1 engine, while the duct 80 is a housing structure within the gas turbine engine.

The combined panel and liner 82 includes a ceramic matrix composite panel 88 and a backing metal liner 90. The combination 82 can be located in a combustor, an exhaust nozzle, in an augmentor, or in any other location within a gas turbine engine which sees hot products of combustion.

Figure 3:
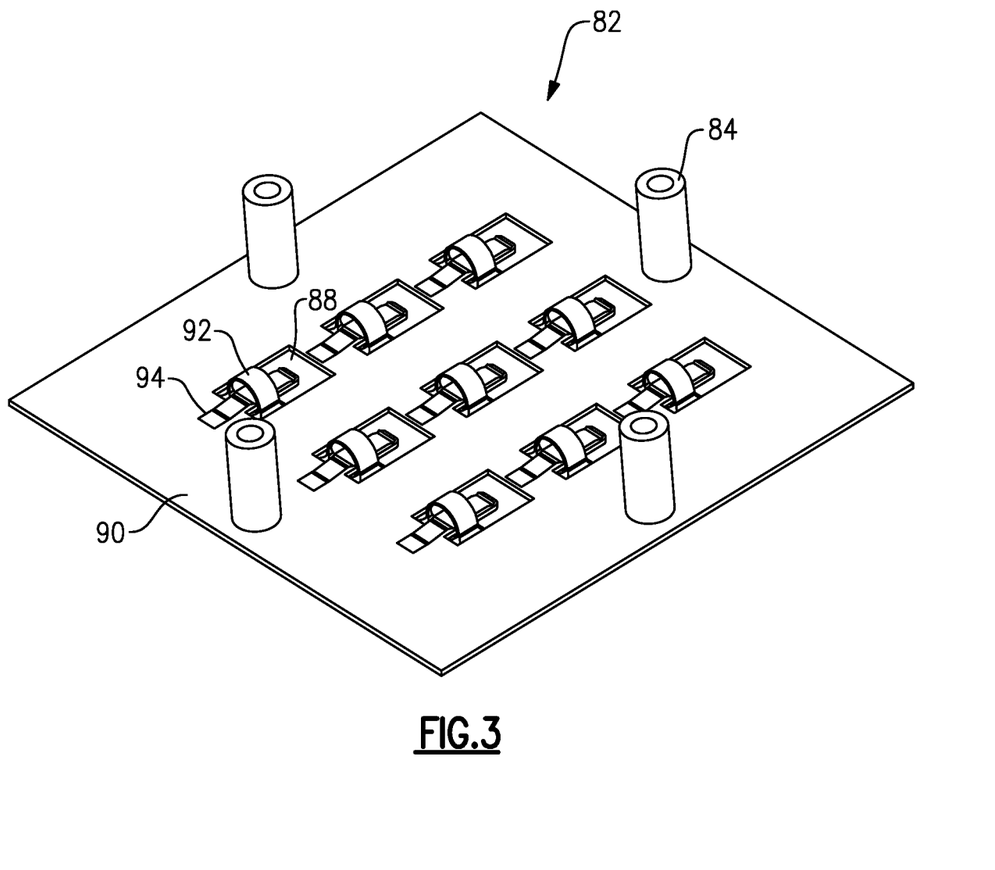
FIG. 3 shows a detail of the liner and panel combination.

FIG. 3 shows the combination 82. As shown, the panel 88 has rings 92 which are mounted on spring fingers 94 fixed to the liner 90. The spring fingers 94 provide a bias force biasing the ceramic matrix composite panel 88 onto the liner 90 and securely holding it, but not providing a force high enough to fracture the ceramic matrix composite material.

Figure 4:
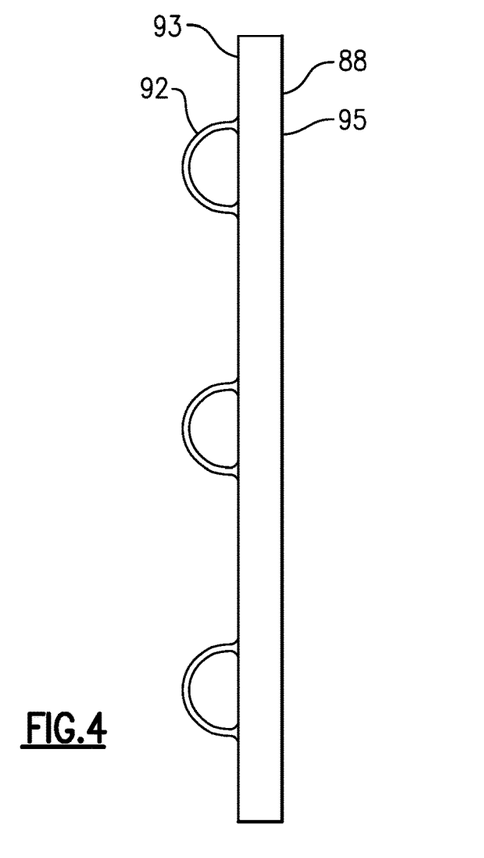
FIG. 4 shows a detail of a panel.

FIG. 4 shows a detail of the panel 88 and the rings 92 which extend away from one face of the panel 88. It should be understood the rings 92 extend away from a face 93 which is on an opposed side of the panel 88 relative to a face 95 which will face the hot products of combustion.

Figure 5:
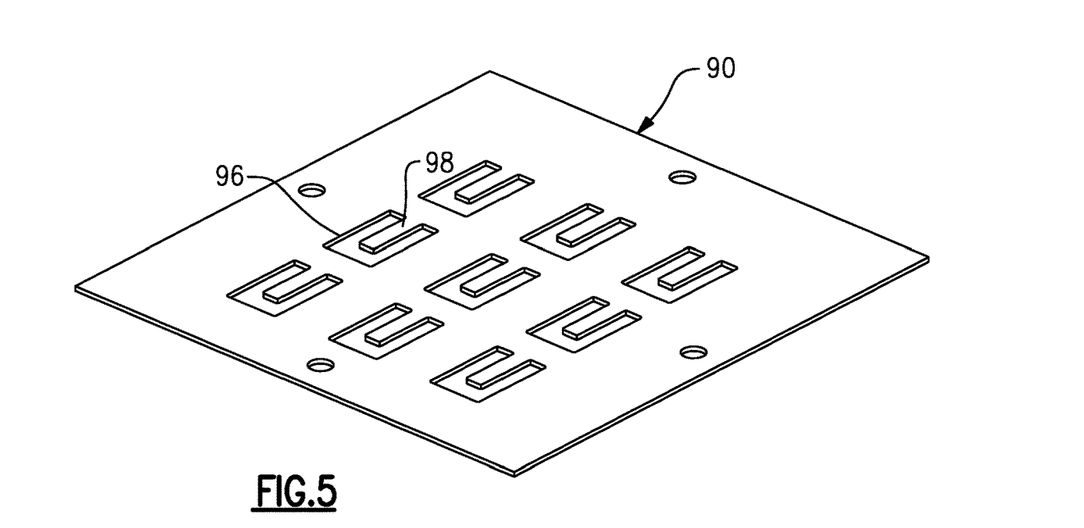
FIG. 5 shows a detail of a backing plate.
Figure 6:
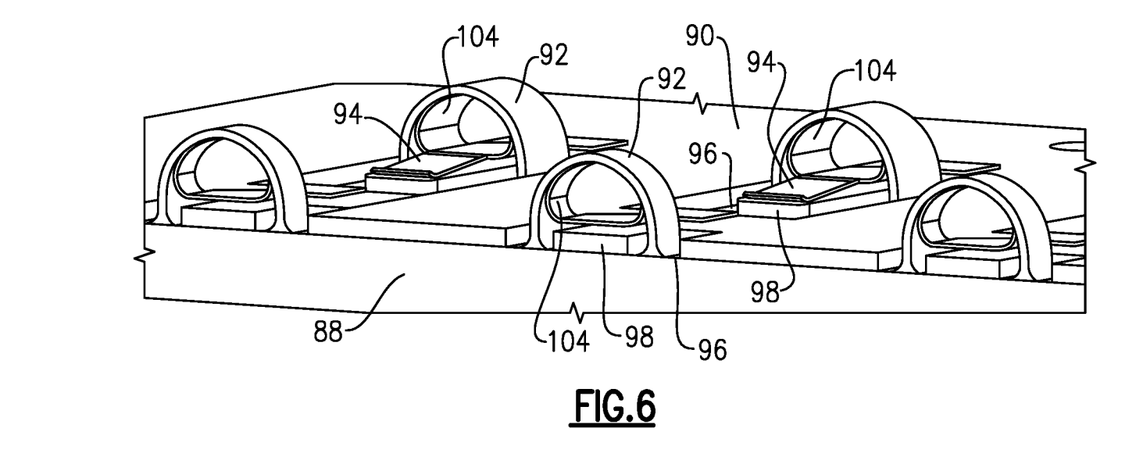
FIG. 6 shows a detail of the assembled panel and backing plate.

FIG. 5 shows a detail of the liner 90. As shown, there are a plurality of apertures 96, each defining a C-shaped opening around an intermediate finger 98. FIG. 6 shows the rings 92 received outwardly of a ring 104 on a spring finger 94. The spring finger 94 sits on the liner finger 98.

Figure 7:
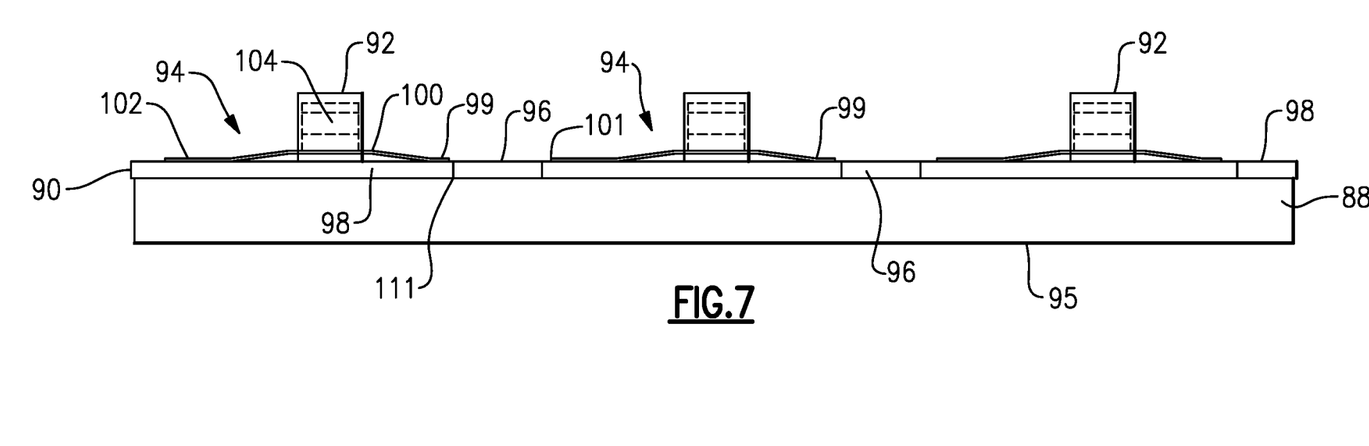
FIG. 7 shows a further detail of the assembled panel and backing plate.

As shown in FIG. 7, the spring finger 94 has a remote end 102 which is attached, such as by welding, to the liner 90, preferably, at a location beyond the ends of the aperture 96. An opposed end 99 of the finger is spaced by a central web 100 which extends away from an inner face 101 of the liner 90, such that there is a bow in the spring 94. The remote end 99 is free to slide along the finger 98 at the opposed end. As can be seen, a portion of the slot or aperture 96 is forward of a forward end 111 of the finger 98.

When the spring ring 104 is received within the extending member or panel ring 92, the ring 104 is biased downwardly toward the face 101 of the liner 90. This creates a bias force biasing the ring 92 and, hence, the liner 88 in a direction which is upward in FIG. 7, or away from the hot products of combustion which will be toward the face 95 of the panel 88.

Figure 8A:
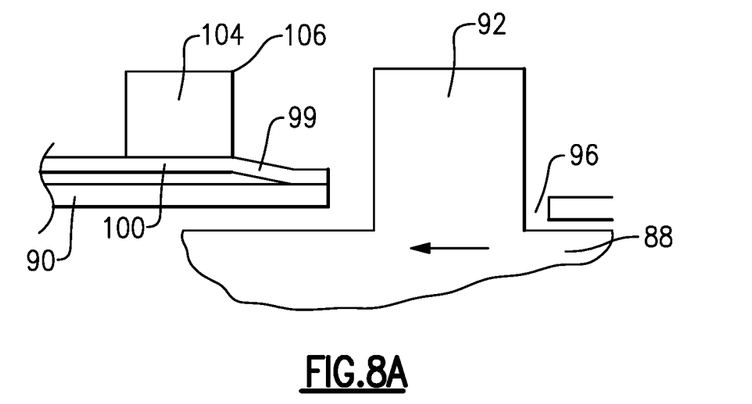
FIG. 8A shows a first step in assembling the panel and backing plate.
Figure 8B:
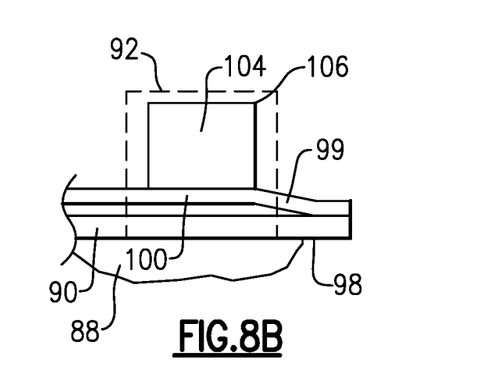
FIG. 8B shows a subsequent step.

FIG. 8A shows a first step in assembling the panel 88 to the liner 90. As shown, the ring 92 is inserted through the aperture 96. In this position, the ring 104 is free. As shown in FIG. 8B, the rings 92 are then moved to then be over the ring 104 and bias the ring 104 downwardly as shown in FIG. 7. This creates a bias force as described above. Although FIG. 8B shows the panel 88 being the portion that is actually moved to have ring 92 slide onto ring 94, it should be understood that the opposite direction of movement, with the panel 90 being moved such that ring 104 is moved within ring 92 would also be possible. Either direction would be met by the description of sliding the ring 92 onto the ring 104.

Figure 9:
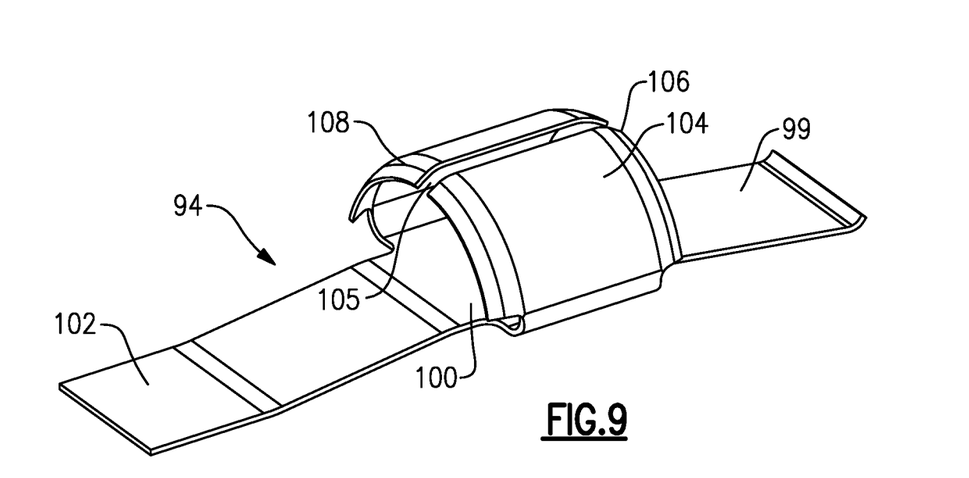
FIG. 9 shows a detail of a spring finger.

FIG. 9 shows a detail of the spring 94. As shown, chamfers 106 and 108 may be formed at ends of the ring 104 to facilitate the sliding of the ring 92 into rings 104. In addition, there is a circumferentially central slot 105 creating two discontinuous sides which assists in creating a spring force from the rings 104 to be transferred into the central web 100 and the end 99.

The combined liner and panel 82 for use in a gas turbine engine has a ceramic matrix composite panel 88 having a plurality of extending members or rings 92 extending away from a face 95 of ceramic matrix composite panel 88 which will face hot products of combustion. The liner 90 includes a plurality of spring members 94 that apply a bias force biasing the extending members 92. The spring members 94 bias the extending members 92 on the panel in a direction away from the face 95 of the panel which will face the hot products of combustion. While rings 92 are disclosed, other extending members may be utilized.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of attaching a ceramic matrix composite panel to a liner comprising:
   providing the ceramic matrix composite panel, having a plurality of members extending away from a face of the ceramic matrix composite panel which will face hot products of combustion, and the liner including a plurality of spring members;
   sliding said extending members on said panel onto said spring members on said liner to create a bias force;
   wherein said liner is formed with apertures and said extending members are moved through said apertures prior to being slid onto said spring members; and
   wherein said extending members are rings and said spring member includes a spring ring, and said extending member ring is slid onto said spring ring.

* * * * *